United States Patent [19]

Petitjean et al.

[11] Patent Number: 5,024,098
[45] Date of Patent: Jun. 18, 1991

[54] PRESSURE SENSOR USEABLE IN OIL WELLS

[75] Inventors: Luc Petitjean, Vincennes; Michel Valdois, Cachan, both of France

[73] Assignee: Schlumberger Technology Corporation, New York, N.Y.

[21] Appl. No.: 428,304

[22] Filed: Oct. 27, 1989

[30] Foreign Application Priority Data

Oct. 27, 1988 [FR] France ................ 88 14005

[51] Int. Cl.$^5$ ................................ G01L 9/06
[52] U.S. Cl. ........................ 73/729; 73/751; 73/706; 73/727
[58] Field of Search ........... 73/729, 706, 727, 720, 73/721, 754, 726, 756, 151; 338/4, 42, DIG. 4

[56] References Cited

U.S. PATENT DOCUMENTS

| | | | |
|---|---|---|---|
| 4,084,438 | 4/1978 | Lee et al. | 73/706 |
| 4,576,049 | 3/1986 | Kohnlechner | 73/706 |
| 4,586,108 | 4/1986 | Frick | 361/283 |
| 4,622,855 | 11/1986 | Sinha et al. | 73/729 |
| 4,644,797 | 2/1987 | Ichikawa et al. | 73/754 |
| 4,800,758 | 1/1989 | Knecht et al. | 73/729 |

FOREIGN PATENT DOCUMENTS

DE3313261 10/1984 Fed. Rep. of Germany .
GB-A-1069435 5/1967 United Kingdom .

Primary Examiner—Donald O. Woodiel
Attorney, Agent, or Firm—Leonard W. Pojunas; Marc D. Foodman

[57] ABSTRACT

A pressure sensor of the present invention can perform pressure measurements under very severe mechanical and thermal conditions. It comprises a cell carrying a strain-measuring circuit. The cell is placed inside a body and is put into contact with the pressure to be measured. The cell has a hermetically sealed internal chamber inside which pressure is set to a predetermined reference value. The outside surface of the cell is subjected to the pressure to be measured. The cell is constituted by two half-shells joined together according to a join plane. The cell is preferably made of sapphire, with the crystal axis of the sapphire being perpendicular to the join plane so as to obtain isotropic stresses. A strain-gauge circuit is deposited on a plane surface of one of the half-shells, parallel to the join plane. The sensor is particularly suitable for testing oil deposits.

7 Claims, 2 Drawing Sheets

PRESSURE SENSOR USEABLE IN OIL WELLS

BACKGROUND OF THE INVENTION

1. Technical Field

The present invention is directed to a sensor. More particularly, the present invention is directed to a pressure sensor for use in hydrocarbon wells.

2. Background Information

After a well is drilled and a reservoir is located, an evaluation of the reservoir is conducted in order to determine the conditions under which the reservoir may be exploited, if at all. This process is referred to as testing. The various measurements performed during testing include temperature and pressure measurements of the fluid in the well.

The sensors employed must be capable of withstanding severe conditions of use while remaining reliable throughout the duration of a measuring period, i.e. three to four weeks. In particular, the sensors should be capable of withstanding temperatures in the range of $-50°$ C. for storage purposes to more than $200°$ C. for downhole operation. Additionally, the sensors should be capable of withstanding pressure to 1400 bars ($14 \times 10^7$ Pa.). Further, the sensors should be accurate and stable, both over time as well as over the temperature and pressure ranges.

The sensors presently available on the market do not satisfy these specifications in full. One type of sensor comprises a body with a measurement cell sealed, via welding, inside. The measurement cell is constituted by a single flat steel substrate having a first insulating layer deposited thereon, followed by a strain gauge, with a second insulating layer mounted thereon, leaving two metal connection tabs uncovered. The pressure to be measured is applied to the first face of said cell while the second face of the cell is at a reference pressure, e.g., atmospheric pressure. Serious drawbacks are inherent in this type of construction.

Firstly, the connection between the measuring element (or sensitive membrane) and the body of the sensor, often performed by welding, is a potential source of instability. The lack of mechanical isolation between the measurement element and the body of the sensor can give rise to differences between measurement observed before and after sensor assembly, and the clamping couple in particular can have an effect on the output level. Further, sensor drift is observed when the sensor is subjected to high pressure and temperature over a period of several weeks. This drift can be attributed, in part, to elasticity and creep.

In British patent No. 1,069,435 to Maclachlan, herein incorporated by reference, a pressure sensor is discussed wherein a deformable support carrying thin-film resistance elements are arranged in a bridge configuration. The support is made of a tube having either elliptical or oval cross-section, of such material as vitreous silica or sapphire. A pressure difference between the interior and the exterior the tube causes deformation thereof, resulting in differential straining of the resistance elements. This patent, however, gives no indication concerning the means of sealing the interior of the tube from the surrounhding fluid. Such information is crucial for a sensor intended for use in hydrocarbon wells where pressure of to 1,400 bars can be encountered.

SUMMARY OF THE INVENTION

The object of the present invention is to provide a pressure sensor adapted for use in high pressure media, which presents a high accuracy, which is stable over time and reliable with respect to measurement reproducibility.

There is provided according to the present invention a pressure sensor comprising a cell having its outside surface subjected to the pressure to be measurement and defining a hermetically sealed internal chamber in which the pressure is at a predetermined low value. The cell comprising two portions of the same material joined together at a join plane. At least one of the these portions has, in a deformable part thereof, an outside plane surface parallel to the join plane, wherein a strain-measuring device, preferably constituted by thin-film electrical resistances, is deposited on the outside plane surface.

Preferably, at least one of the portions comprises a peripheral wall and a central cap having the circuit deposited thereon, wherein only the central cap being substantially deformable in response to pressure.

The material of the cell is preferably sapphire, more preferably a monocrystal with its crystal axis extending perpendicularly to the join plane between the two portions of the cell, thereby obtaining isotropic stress in the join plane.

DESCRIPTION OF THE PREFERRED EMBODIMENT(S)

Figure 1:
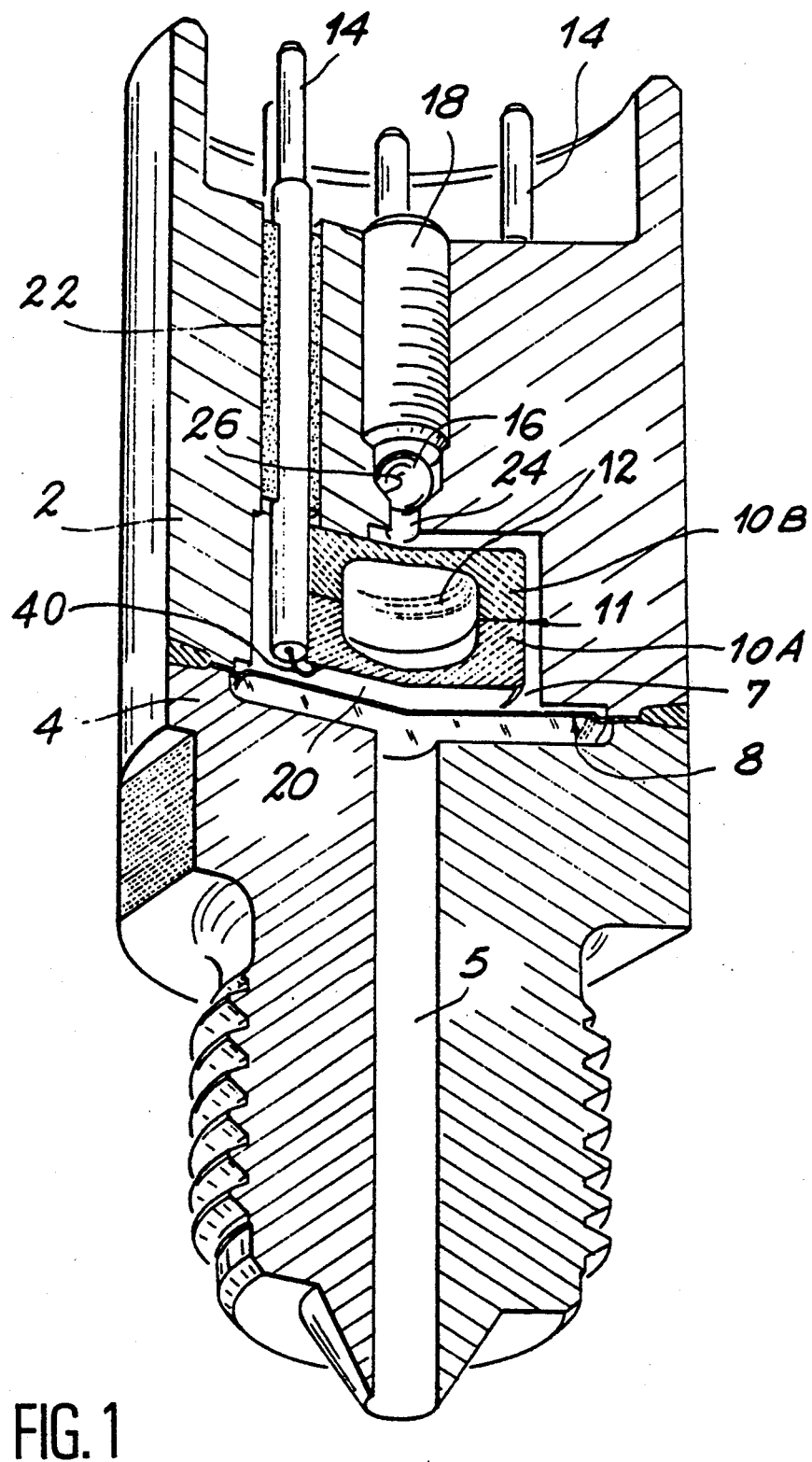
FIG. 1 illustrates a sectional view through a pressure sensor in accordance with the present invention and fitted with different half-shells.

With reference to FIG. 1, a pressure sensor of the present invention is shown. The sensor comprises a measurement cell constituted by part 10A and 10B joined at join plane 11. The measurement cell is located in a housing comprising main body 2 and leading body 4, fixed securely thereto. The measurement cell is placed in internal cavity 7 located in main body 2. The cell carries a strain-measuring device in the form of electrical resistances which are formed by thin film deposits. The technique of making thin film deposits is known in the art. See, e.g., R. G. Duckworth, Tantalum Thin Film Resistor, printed in Thin Solid Films, vol. 10 (1972), herein incorporated by reference.

The measurement cell delivers measurement signals to a conventional processing system (not shown) by connection means 14. The connection means pass through main body 2 via sealed feedthroughs 22, and preferably terminate in internal cavity 7 on either side of the measurement cell.

A primary function of the leading body 4 of the pressure sensor is to allow measurement cell contact with the surrounding fluid. To this end, the leading body has axial channel 5, allowing communication between the fluid located external the housing and the internal cavity containing the measurement cell.

Preferably, membrane 8 is placed between main body 2 and leading body 4 in order to protect the measurement cell. Thus, the borehole fluid does not come into direct contact with the measurement cell. However, the membrane is preferably sufficiently flexible so as to transmit the pressure of the fluid to internal cavity 7 containing the measurement cell.

The volume of the internal cavity, as delimited by the membrane, is preferably filled with oil (not shown) which surrounds the measurement cell. The oil is preferably inserted during assembly, after parts 2 and 4 of the body have been assemble to each other, thereby enclosing the membrane and the measurement cell. The pressure inside the internal cavity is reduce to enable the oil to be inserted via channel 24. Once the internal cavity has been completely filled with oil, pressure ball 16 is pressed against conical seat 26 located at the outlet of channel 24. Pressure screw 18 is inserted in an extension to the channel 24 and urges ball 16 against seat 26, thereby sealing the internal cavity.

It can thus be seen that the entire outside surface of the cell is subjected to the pressure to be measured, and the cell is mechanically isolated from the housing of the sensor. This makes it possible to avoid problems related to the mechanical connection of the measurement as encountered when implementing prior art measurement cells.

In accordance with another feature of the present invention, the measurement cell defines hermetically sealed internal chamber 12. In order to be able to measure the pressure of the external fluid, a predetermined reference pressure is established inside the internal chamber. This pressure is preferably about 0.1 Pascals.

In a preferred embodiment, the measurement cell is made of sapphire, more particularly, a monocrystalline sapphire such as alumina. The preferred material not only has excellent corrosion resistance, but also has perfectly elastic and linear behavior all the way to its breakage point. Additionally, it has no plasticity at all and it is insensitive to dislocation motion and creep, phenomena which are responsible, in part, for the drift observed in prior art sensors. Given that the measurement cell carries a strain gauge circuit constituting the measurement element, these features are advantageous.

The choice of sapphire as the measurement cell material further has the advantage that sapphire is a good insulator, thus avoiding the need for an insulating layer required between the prior art metal substrate and the strain-measuring device. Not only does omitting the insulating layer make manufacture of the sensor simpler, it also improves the characteristics of the sensor by eliminating problems relating to the insulating layer becoming less effective at high temperature.

Figure 3:
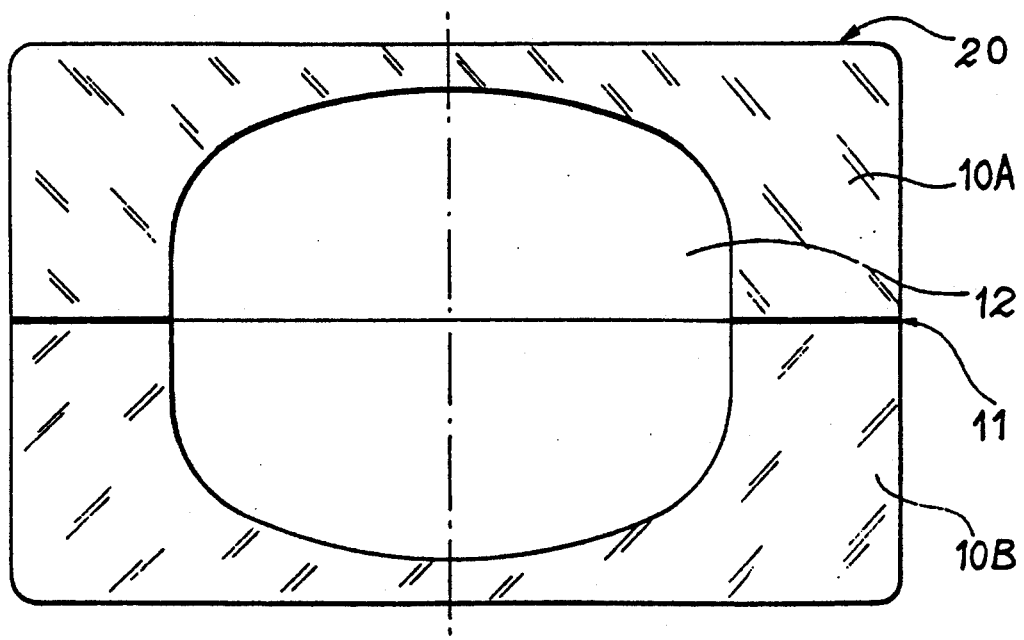
FIG. 3 illustrates a section through the cell on a plane perpendicular to its join plane.

Turning now to FIG. 3, the measurement cell is shown comprising half-shells 10A and 10B, each defining an internal half-chamber, joined at join plane 11 to form internal chamber 12. A strain-measuring device is placed on plane face 20 of one of the half-shells, preferably 10A. It is noted that plane face 20 is parallel to join plane 11.

Half-shells 10A and 10B are preferably joined together by a sealing glass which has a coefficient of expansion as close to that of sapphire as possible. Techniques for joining are known in the art. For example, Swiss patent application No. 8272/79, published as No. 632 891 G, herein incorporated by reference.

The sapphire is preferably a monocrystal which is cut to obtain two half-shells 10A and 10B having the same crystal axis. The axis perpendicular to join plane 11 face 20 on which the strain gauges are preferably deposited constituted crystal axis c of the crystal. Since its structure is a hexagonal, sapphire presents deformations, expansions and stresses which are isotropic in a plane perpendicular to its crystal axis c. For conventions concerning the axis of a crystal, reference may be made to J. F. Nye, Physical Properties of Crystal, Oxford University Press, New York (1985), herein incorporated by reference. By choosing to have the crystal axis in this direction, problems due to differential expansion in the join plane which could affect term stability of the seal in the join plane are eliminated, thus avoiding problems with long term stability of the sensor.

As shown in FIG. 1, half-shells 10A and 10B are shown as having different internal surfaces for the purpose of showing several of the possible implementations of these two half-shells.

FIG. 3 shows a preferred embodiment where the measurement cell comprises half-shells 10A and 10B which are indentical. Each half-shell comprises a peripheral wall having join plane 11 as its end face and cylindrical external and internal surfaces, and a central cap portion having an internal surface in the form of a flattened ellipsoid and a plane external surface. Owing to the symmetry of the cell, this embodiment is optimal from the standpoint of reducing stress in the join plane.

An alternative (not shown) to the embodiment of FIG. 3 comprises one half-shell such as shown at 10A and, instead of half-shell 10B, a cylindrical plate or disk having the same external surface as half-shell 10B, but an internal plane face flush with the join plane. In this case, the internal chamber of the cell will be limited to the upper half of chamber 12 as shown in FIG. 3, and the strain-measuring circuit would be deposited on the external surface of half-shell 10A, which would be the only deformable portion of the cell. As in the other embodiments, the two portions of the cell, the cylindrical disk and the half-shell will be of the same material, preferably sapphire.

The cell is preferably mounted flexibly inside the internal cavity. Spacers of flexible material (not shown) are inserted on the wall of the internal cavity.

Membrane 8 is made of a material having mechanical properties which are stable over the range of temperatures over which the pressure sensor is used. However, it must also exhibit a high degree of elastic deformation in order to transmit pressure of the external medium to the oil surrounding the measurement cell. Good resistance to corrosion in an aqueous medium is preferred in applications involving boreholes.

Figure 2:
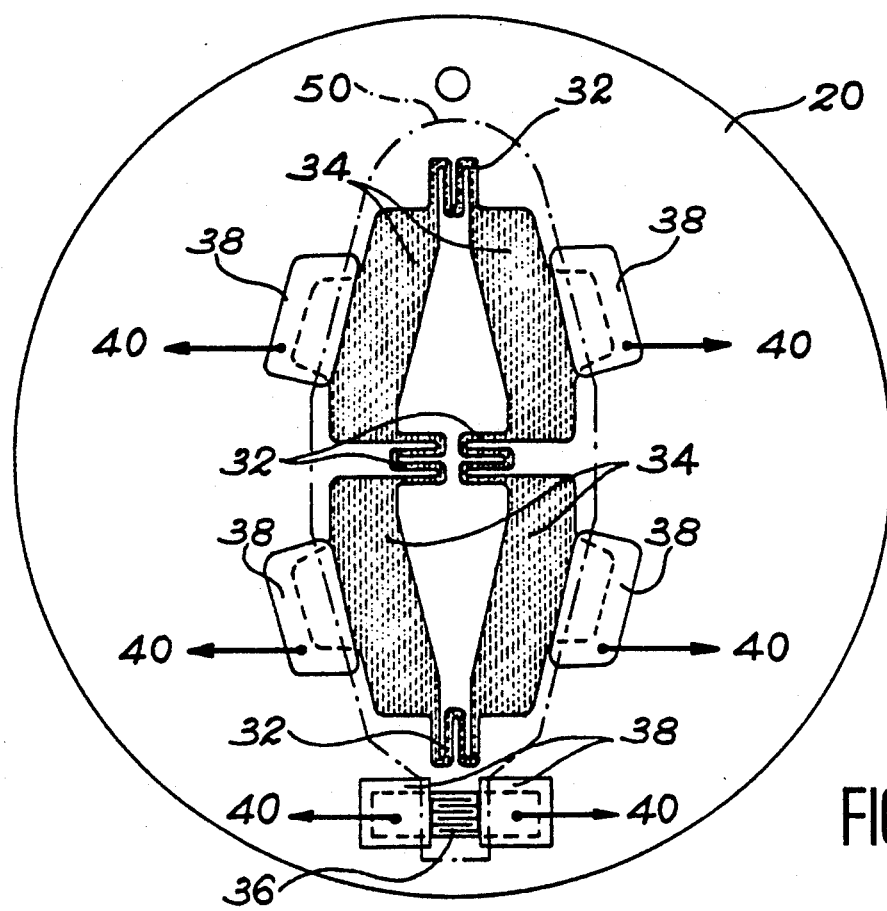
FIG. 2 illustrates a diagram showing the positioning of the gauges and their interconnections on one of the faces of the cell used in the pressure sensor of the present invention.

FIG. 2 shows an electrical resistance strain-measuring device preferably used in the sensor of the present invention. The device is composed of thin-film electrical resistances which are preferably deposited directly on the outside plane surface.

The diameter of the cell at surface 20 on which the device is implanted is preferably about 10 millimeters (mm). The device comprises four small resistances 32, also referred to as strain gauges. Their central portions are preferably less than 50 micrometers wide. Resistance 32 are preferably interconnected in a Wheatstone bridge configuration.

The Wheatstone bridge circuit is placed about the center of surface 20 and is preferably disposed symmetrically, relative to the center of the surface, while being elongate along a diameter thereof. Connections 34 interconnect resistances 32 and may be made using the same material as resistances 32 and may be deposited simultaneously therewith. The connections are preferably large in area to minimize their electrical resistance. This configuration thus ensures a high degree both of temperature stability and of long term stability. Metal contacts 38 connect connections 34 via wires 40 to connection cables 14 (FIG. 1). In the preferred embodiment, protective layer 50 is placed over the strain-measuring device, so that only metal contacts 38 are exposed.

On surface 20 shown in FIG. 2, resistance 36 is preferably placed at the periphery of the surface at a location which is not subjected to deformation under the effect of pressure. This resistance measures the temperature of the strain-measuring device. This resistance and its connections are made in a manner analogous to the way in which the strain-measuring device is made.

Protective layer 50 for insulating resistances 32 and connections 34 preferably also covers resistance 36. Resistance 36 is similarly connected via two contacts 38 to one of cables 14 (FIG. 1). This allows the temperature sensing element to be extremely close to the pressure sensing element, as well as allowing it to be on the same surface.

The temperature measurement obtained in this way is preferably used to compensate for the effects of temperature on the strain gauges, thereby making it possible to provide a pressure sensor which is insensitive, in practice, to temperature variation.

The strain-measuring device in the form of a Wheatstone bridge is preferably balanced by removing material from respective connections 34, e.g., by use of a laser.

Although illustrative embodiments of the present invention have been described in detail with reference to the accompanying drawings, it is to be understood that the invention is not limited to those precise embodiments. Various changes or modifications may be effected therein by one skilled in the art without departing from the scope or spirit of the invention.

What we claim in our invention:
1. A pressure sensor comprising:
    a cell comprising sapphire and having an outside surface which is subjectable to a pressure to be measured, said cell having two portions of the same material joined together at a join plane, at least one of said cell portions having a deformable outside plane surface parallel to said join plane;
    a hermetically sealed chamber, located inside said cell, in which a predetermined pressure is contained; and
    a strain-measuring device integrally deposited on said outside plane surface; wherein said cell comprises monocrystalline sapphire wherein the crystal axis thereof being perpendicular to said join plane.

2. The sensor of claim 1 said sensor further comprising:
    isolating fluid in said internal cavity to isolate said measurement cell from said sensor housing.

3. A sensor according to claim 1 wherein said cell portion are symmetrical with respect to an axis perpendicular to the join plane.

4. The sensor according to claim 1 said strain-measuring device comprising thin-film electrical resistances.

5. A sensor according to claim 1 wherein said cell portions are substantially identical half-shells.

6. A pressure sensor comprising:
    a cell having an outside surface which is subjectable to a pressure to be measured, said cell having two portions of the same material joined together at a join plane, at least one of said cell portions having a deformable outside plane surface parallel to said join plane;
    a hermetically sealed chamber, located inside said cell, in which a predetermined pressure is contained; and
    a strain-measuring device integrally deposited on said outside plane surface;
    wherein at least one of said cell portions comprises a peripheral wall and a central cap portion having said strain-measuring device deposited thereon, wherein said cap portion is substantially deformable to the exclusion of said peripheral wall and has an internal surface in the form of a flattened ellipsoid.

7. A sensor for use in a borehole containing fluid, said sensor to measure the pressure of the borehole fluid, said sensor comprising:
    a sensor including a housing having a deformable outside surface subjectable to the pressure of the borehole fluid and an internal cavity, a channel to permit fluid communication between the exterior of said housing and said internal cavity, and a flexible membrane therebetween;
    a measurement cell defining a join plane that parallels the deformable outside surface and which is located in said internal cavity, said cell including a hermetically sealed internal chamber having a predetermined reference pressure therein; and
    a strain gauge mounted on an external portion of said measurement cell, said gauge mounted substantially parallel to said membrane;
    wherein said measurement cell comprises monocrystalline sapphire and the crystal axis of the sapphire is perpendicular to said external portion of said measurement cell on which said strain gauge is mounted.

* * * * *